(No Model.)
E. C. EDMONDSON.
FEEDING MECHANISM FOR GRAIN PLANTERS.
No. 309,212. Patented Dec. 16, 1884.
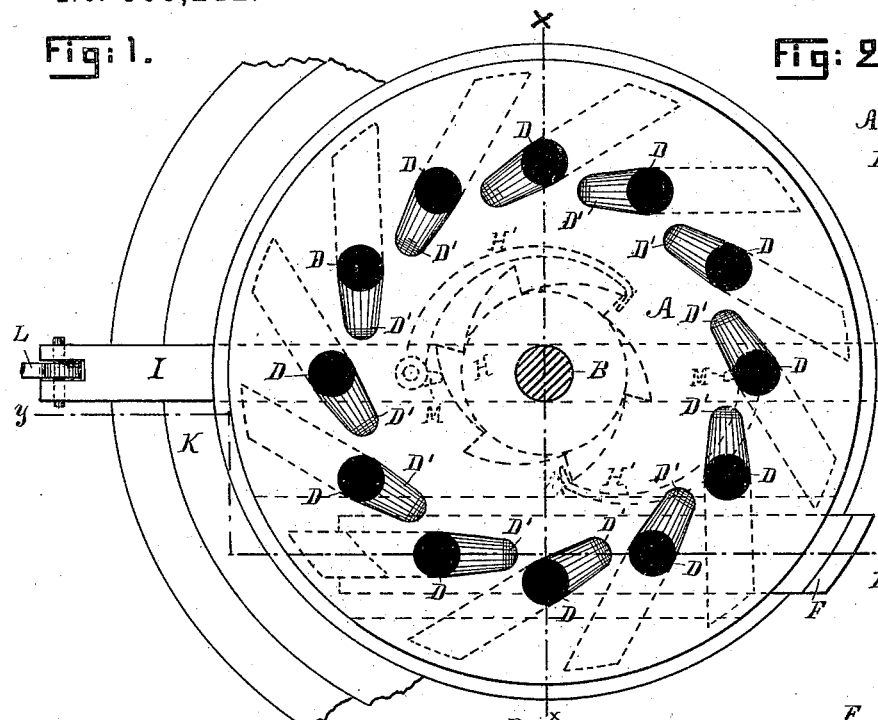
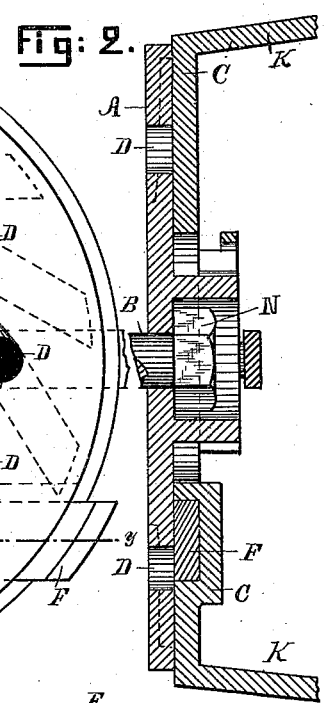
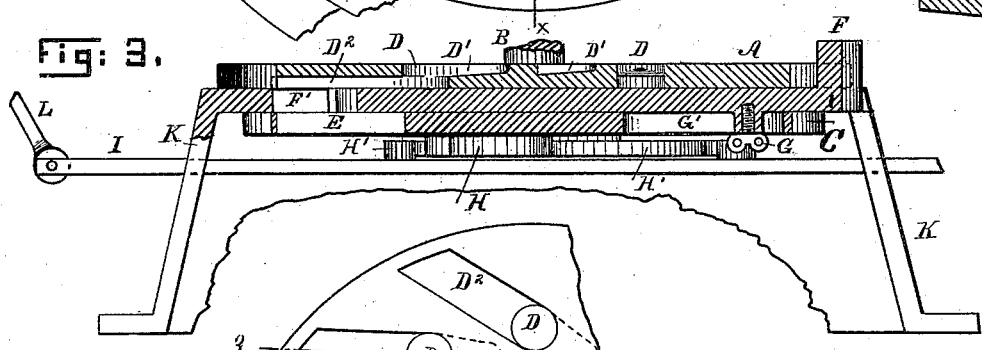
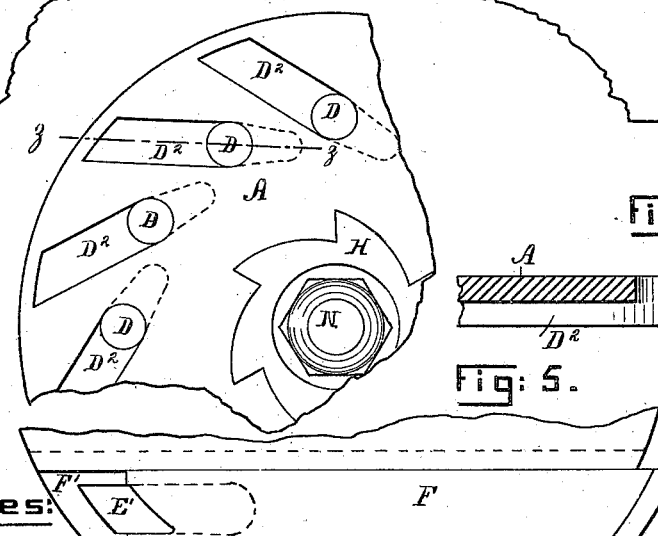
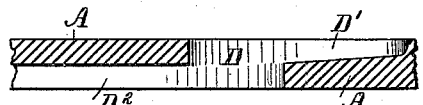
Witnesses:
O. Nichols
C A Cregar
Inventor.
Edward C. Edmondson.
By N. Emery Whitney
Atty

UNITED STATES PATENT OFFICE.

EDWARD C. EDMONDSON, OF SPRINGFIELD, OHIO.

FEEDING MECHANISM FOR GRAIN-PLANTERS.

SPECIFICATION forming part of Letters Patent No. 309,212, dated December 16, 1884.

Application filed March 10, 1884. (No model.)

*To all whom it may concern:*

Be it known that I, EDWARD C. EDMONDSON, of the city of Springfield, county of Clark, and State of Ohio, have invented certain new and useful Improvements in Feeding Mechanism for Grain-Planters, of which the following is a specification.

This invention relates to seed or grain planters, and is intended as an improvement upon the feeding mechanism. As heretofore constructed, machines of this class have usually been provided with cut-off valves, which were operated to cut off the amount of seed or grain to be planted. This, however, has proven unreliable, insomuch as it would tend to shave or disintegrate the grain, thereby clogging the mechanism.

The object of my invention is to provide a feed mechanism for grain-planters that is cheap and simple in construction and positive in its operation, and which will obviate the difficulties experienced with grain-planters of usual construction.

My invention consists in a feeding mechanism having a revolving disk or feed-plate provided with a series of feed-holes, and a series of guide and receiving slots leading into said holes, and a supporting or bed plate having a feed-opening, and provided with an adjustable slide to regulate the amount of grain to be planted, all as hereinafter fully described.

Figure 1 represents in plan view a feeding mechanism for grain-planters made in accordance with my invention; Fig. 2, a sectional view of the same on dotted line $x\ x$; and Fig. 3, a sectional view on dotted line $y\ y$, Fig. 1; Fig. 4, an under side view of feed-plate, part of same being broken away; Fig. 5, a partial top view of the bed-plate, showing the slide and discharge-opening; Fig. 6, an enlarged detail section through one of the feed-holes on dotted line $z\ z$, Fig. 4.

The revolving disk or feed-plate A, supported on shaft B in close proximity to the bed-plate C, is provided with a series of feed-holes, D, leading into which are grooves D', which receive and guide the grain into the holes D as it drops from the hopper, which is located, as usual, just above the feed-plate A. In the under side of said feed-plate, and leading out from the feed-holes D radially, are a series of slots or grooves, $D^2$, into which the grain is guided after falling into feed-holes D, the said grooves $D^2$ acting as carriers, holding the grain until in the revolution of the feed-plate the said grooves come opposite to the discharge-opening E in the bed-plate C, as will be hereinafter more fully described. The bed-plate C is provided with an adjustable slide, F, resting in a slot, F', in the said bed-plate, which may be adjusted by means of the thumb-screw G, extended through an elongated slot, G', in the bed-plate, to cover, more or less, the discharge-opening E, to govern the amount of grain dropped through the opening E into a spout (not shown) at the under side of the bed-plate as the feed-openings D and carrier-grooves $D^2$ come opposite thereto. The bed-plate C will be corrugated or undulated on its upper face radially in the direction of the feed-holes D, so that in revolving the feed-plate A all tendency of the grain to work toward the axis of revolution will be overcome. The end of the adjustable slide nearest the discharge-opening E will be slightly concaved at its upper face, to prevent the grain falling into the discharge-opening E out of the carriers $D^2$ at the point covered by the said slide.

Extending through the bed-plate C, and forming a part of the feed-plate A, is a ratchet, H, herein shown as provided with six teeth, said ratchet being turned, as desired, by means of pawls H' H', pivoted to a sliding bar, I, which is guided in slots in the frame-work K of the bed-plate, said bar being operated by means of lever L.

As will be noticed by dotted lines, Fig. 1, the pawls H' H' are provided with lips M, which, as the bar I is moved to turn the ratchet H, will strike against the said ratchet and throw the pawls into engagement with the teeth.

The feed mechanism will be covered with a plate (not shown) sloping at all points in the direction of the feed-holes D, where it is open to allow the grain to be fed as nearly above the feed-holes as possible. It is desirable to keep the feed-plate A in close proximity to the bed-plate, but not contacting, to prevent undue friction. I have provided for this by making an adjustable connection between the said feed-plate and the shaft B, herein shown as provided with an adjusting-nut, N, at its lower end. The shaft B will be supported in bearings at its upper end in the frame-work of the planter, or otherwise.

It is obvious that instead of using a ratchet and pawls for turning the feed-plate other operating mechanism might be used without departing from my invention.

I claim—

1. In a feeding mechanism for grain-planters, the revolving disk provided with a series of feed-holes, as described, combined with a stationary bed-plate having an elongated discharge-opening provided with an adjustable slide, to open or close the said opening more or less, and mechanism to clamp and hold the said slide in any desired position, all substantially as and for the purpose set forth.

2. The combination, in a feeding mechanism for grain-planters, of the revolving disk A, having feed-holes D, guide-grooves D', and carrier-slots D², as described, the bed-plate C, provided with a discharge-opening and adjustable slide, to regulate the width of said opening, and a ratchet and pawls to turn the said revolving disk, all as and for the purpose set forth.

3. The combination, in a feeding mechanism for grain-drills having a revolving disk supported upon a stationary bed-plate, provided with a discharge-opening, and an adjustable slide to gage the width of said opening, of the adjusting screw or bolt G, extending through an elongated gaging-slot in the said bed-plate to clamp and hold the slide at any desired position, substantially as described.

4. The combination, in a feeding mechanism for grain-planters having a revolving disk provided with feed-holes D, guide-grooves D', and carrier-slots D², supported and revolving on a stationary bed-plate provided with an opening and regulating-slide, and ratchet H, attached to the said revolving disk, of pawls H' H', provided with lips adapted to strike against the said ratchet and throw the pawls into engagement with the ratchet, and mechanism to operate the said pawls, substantially as and for the purpose described.

5. The combination, with the ratchet H, attached to the revolving disk A, and pawls H' H', provided with lips M, to throw the pawls into engagement with the ratchet, of the sliding bar I, to which the pawls are pivoted, as described, and mechanism to operate the said sliding bar, substantially as and for the purpose set forth.

In witness whereof I have hereunto set my hand and seal, at Springfield, Ohio, this 1st day of March, A. D. 1884.

EDWARD C. EDMONDSON. [L. S.]

In presence of—
N. E. C. WHITNEY,
CHASE STEWART.